United States Patent
Liu et al.

(10) Patent No.: US 10,735,647 B2
(45) Date of Patent: Aug. 4, 2020

(54) IMAGE PROCESSING DEVICE AND IMAGE PROCESSING METHOD

(71) Applicant: Realtek Semiconductor Corporation, Hsinchu (TW)

(72) Inventors: Kai Liu, Taipei (TW); Wen-Tsung Huang, Chiayi (TW); Shih-Hsiang Yen, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 59 days.

(21) Appl. No.: 16/139,278

(22) Filed: Sep. 24, 2018

(65) Prior Publication Data
US 2019/0306413 A1 Oct. 3, 2019

(30) Foreign Application Priority Data
Mar. 29, 2018 (TW) .............................. 107111049 A

(51) Int. Cl.
*H04N 5/232* (2006.01)
*H04N 5/33* (2006.01)
(Continued)

(52) U.S. Cl.
CPC ..... *H04N 5/23229* (2013.01); *G06K 9/00288* (2013.01); *G06T 5/002* (2013.01); *H04N 5/2351* (2013.01); *H04N 5/33* (2013.01)

(58) Field of Classification Search
CPC .... H04N 5/23229; H04N 5/2351; H04N 5/33; H04N 5/357; G06T 5/002; G06T 2207/30201; G06T 2207/20224; G06T 2207/10048; G06T 2207/10152; G06K 9/00288
See application file for complete search history.

(56) References Cited

U.S. PATENT DOCUMENTS 5,910,816 A * 6/1999 Fontenot .............. A61B 5/0059
348/162
2005/0105778 A1* 5/2005 Sung .................. G06K 9/00255
382/115
(Continued)

FOREIGN PATENT DOCUMENTS

CN 104145276 A 11/2014
CN 105608415 A 5/2016
(Continued)

OTHER PUBLICATIONS

Infrared—Wikipedia, retrieved from https://en.wikipedia.org/wiki/Infrared on Jan. 20, 2020 (Year: 2020).*

*Primary Examiner* — Timothy J Henn
(74) *Attorney, Agent, or Firm* — Locke Lord LLP; Tim Tingkang Xia, Esq.

(57) ABSTRACT

An image processing method and an image processing device are provided. The image processing method includes capturing a first image of a target irradiated by an infrared light; capturing a second image of the target not irradiated by the infrared light; performing noise suppression and signal enhancement on each of the first image and the second image to generate a first processed image and a second processed image; and processing the first processed image and the second image by a recognition device to recognize the target.

18 Claims, 5 Drawing Sheets

(51) Int. Cl.
*H04N 5/235* (2006.01)
*G06K 9/00* (2006.01)
*G06T 5/00* (2006.01)

(56) References Cited

U.S. PATENT DOCUMENTS

| | | | | |
|---|---|---|---|---|
| 2007/0201738 | A1* | 8/2007 | Toda | H04N 9/045 |
| | | | | 382/144 |
| 2013/0271562 | A1* | 10/2013 | Kim | H04N 5/332 |
| | | | | 348/33 |
| 2016/0150213 | A1* | 5/2016 | Mutti | G06K 9/228 |
| | | | | 348/143 |
| 2017/0330025 | A1* | 11/2017 | Ono | G06K 9/209 |
| 2017/0357881 | A1* | 12/2017 | Hoshino | G08G 1/04 |
| 2018/0285668 | A1* | 10/2018 | Li | G06K 9/00899 |
| 2018/0373948 | A1* | 12/2018 | Wu | G06K 9/00771 |
| 2019/0034702 | A1* | 1/2019 | Hong | G06K 9/2018 |
| 2019/0068908 | A1* | 2/2019 | Kobayashi | G06T 7/521 |
| 2019/0163964 | A1* | 5/2019 | Kawamae | G06K 9/00228 |
| 2019/0282100 | A1* | 9/2019 | Millikan | G01J 3/36 |
| 2019/0293791 | A1* | 9/2019 | Iwai | G01C 3/06 |
| 2019/0318463 | A1* | 10/2019 | Zhang | G06T 7/90 |

FOREIGN PATENT DOCUMENTS

| | | |
|---|---|---|
| TW | 201339992 A | 10/2013 |
| TW | 201715342 A | 5/2017 |

* cited by examiner

IMAGE PROCESSING DEVICE AND IMAGE PROCESSING METHOD

RELATED APPLICATIONS

This application claims priority to Taiwan Application Serial Number 107111049 filed Mar. 29, 2018, which is herein incorporated by reference.

BACKGROUND

Technical Field

The present disclosure relates to an image processing device and an image processing method. More particularly, the present disclosure relates to an image processing method for removing ambient light effects.

Description of Related Art

With growing amount of data stored in electronic devices, extra encryption functions are added to the electronic devices in fabrication. With regard to the encryption functions, in comparison with password authentication, face recognition authentication is more convenient.

However, the face recognition is vulnerable to external ambient light when a photo is captured, thus reducing recognition accuracy.

Therefore, how to provide an image to a face recognition device without being affected by the external ambient light for enhancing recognition accuracy is still a challenging issue.

SUMMARY

The disclosure provides an image processing method. The image processing method includes the following steps. A first image of a target irradiated by infrared light is captured. A second image of the target not irradiated by the infrared light is captured. A first processed image and a second processed image are generated by performing noise suppression and signal enhancement on each of the first image and the second image respectively. The first processed image and the second processed image are processed by a recognition device to recognize the target.

The disclosure also provides another image processing method. The image processing method includes the following steps. A first image of a target irradiated by infrared light is captured. A second image of the target not irradiated by the infrared light is captured. A third image is obtained by subtracting the second image from the first image. A processed image is generated by performing noise suppression and signal enhancement on the third image. The processed image is processed by a recognition device to recognize the target.

The disclosure also provides an image processing device. The image processing device includes a light emitting unit, an image capturing unit and a processor. The light emitting unit is configured to selectively irradiate infrared light. The image capturing unit is configured to capture a first image of a target irradiated by the infrared light when the light emitting unit irradiates the infrared light, and is configured to capture a second image of the target not irradiated by the infrared light when the light emitting unit stops to irradiate the infrared light. The processor is coupled to the image capturing unit, is configured to subtract the second image from the first image to obtain a third image, is configured to perform noise suppression and signal enhancement on the third image to generate an output image, and is configured to output the output image to a recognition device.

In summary, the present disclosure captures images corresponding a target respectively by turning on and off an infrared light source, and performs corresponding noise suppression and signal enhancement on the images, thereby obtaining the images with avoiding ambient light effects, thus further improving recognition accuracy of the recognition device.

It is to be understood that both the foregoing general description and the following detailed description are demonstrated by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
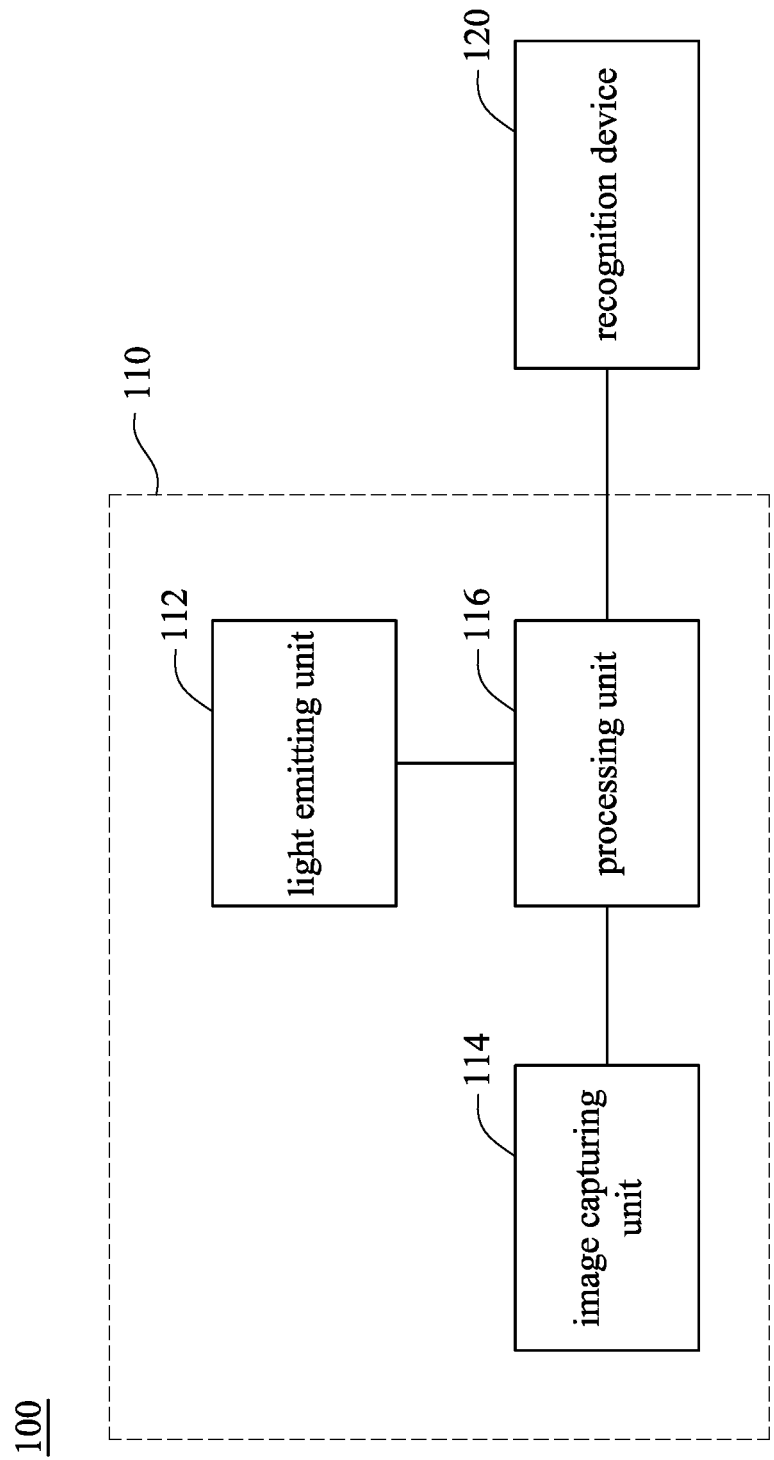
FIG. 1 is a schematic diagram illustrating an electronic device according to an embodiment of the disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

FIG. 1 is a schematic diagram illustrating an electronic device 100 according to an embodiment of the disclosure. The electronic device 100 may be, but not limited to, arranged on one side of a camera of a laptop. The electronic device 100 may be arranged in any portable device, any communication device, or any other type of electronic device that requires a recognition function.

In some embodiments, as shown in FIG. 1, the electronic device 100 includes an image processing device 110 and a recognition device 120. The image processing device 110 is configured to capture an image of a target, to process the image and to output the processed image to the recognition device 120, so as to recognize the target. In some embodiments, the target may be any non-irradiative object. In other words, the target maybe any object that would not be imaged in an infrared (IR) sensor when being not irradiated by a light source.

In some embodiments, the said target includes a human face, and the recognition device 120 is a face recognition device. The image processing device 110 is configured to capture an image including a face, process the image and output the processed image to the face recognition device to recognize the human face in the image. The face recognition device further inputs the recognition result to a corresponding data processing device or adopts a corresponding application to perform corresponding authentication process.

As shown in FIG. 1, in some embodiments, the image processing device 110 includes a light emitting unit 112, an image capturing unit 114 and a processing unit 116, in which the light emitting unit 112 and the image capturing unit 114 are coupled to the processing unit 116 respectively, and the processing unit 116 is further coupled to the recognition device 120.

In some embodiments, the light emitting unit 112 includes a plurality of light emitting elements (not shown). The light emitting unit 112 is arranged beside the image capturing unit 114 and is configured to irradiate infrared light on a target, in which the infrared light may be near Infrared (NIR) radiation, and has a wavelength in a range from 780 nm to 200 nm. In practical applications, the light emitting unit 112 is an infrared light source, and the light emitting element (not shown) may be realized by, but not limited to, a light-emitting diode (LED). Various electronic elements which can generate the infrared light are within the contemplated scope of the present disclosure.

In some embodiments, the image capturing unit 114 is configured to capture an image of the target. In some embodiments, the image capturing unit 114 may be an infrared light sensor and is configured to capture an infrared light image. In this embodiment, the image capturing unit 114 is arranged beside a visible light sensor (or a RGB sensor) in order to perform the image recognition process by using the infrared light sensor and take photos with the visible light sensor. In other embodiments, the image capturing unit 114 may be a RGB-1R sensor. In this embodiment, when being used for image recognition purpose, the image capturing unit 114 can sample out an infrared light component from the information (R, G, B, IR) of each pixel of the received image, and form an infrared light image with the infrared light component of each pixel, and then subsequent image processes are performed according to the infrared light image. When the image capturing unit 114 is used for photo-taking purpose, RGB components can be sampled from the information (R, G, B, IR) of each pixel of the received image as an output image.

In some embodiments, the processing unit 116 is configured to process the image captured by the image capturing unit 114, in which the image processing method includes noise suppression and signal enhancement. In some embodiments, the said noise suppression includes spatial domain noise suppression and time domain noise suppression. In detail, spatial domain noise suppression includes using an averaging filter. In one embodiment with the averaging filter, the processing unit 116 calculates a sum of a pixel value (i.e., the infrared light component) of each pixel and pixel values of 8 pixels around the each pixel in the received image, and divides the sum by 9 to obtain an average value of the 9 pixel values. Then, the processing unit 116 regards the average value as a new pixel value of the each pixel and forms a spatial domain noise suppressed image based on the new pixel values of all pixels in the received image. On the other hand, in some embodiments, the method of time domain noise suppression includes the following steps, in which the processing unit 116 controls the image capturing unit 114 to capture one or more images at each time point and stores the images in a storage unit (not shown); the processing unit 116 weights and averages the pixel values each of which is at the same pixel (position) in each image, so as to generate a new pixel value; and the processing unit 116 generates a time domain noise suppressed image based on the new pixel values of all pixel positions. In another embodiment, the method of time domain noise suppression includes the following steps, in which the processing unit 116 obtains specific statistical information form an image captured by the image capturing unit 114; the processing unit 116 weights and averages the specific statistical information of pixels each of which is at the same position in each image, so as to generate new statistical information; and the processing unit 116 generates a time domain noise suppressed image based on the new statistical information of all pixel positions. Technically speaking, the method of spatial domain noise suppression may reduce the cost of memory but is likely to destroy the details of the image (e.g., the sharpness of the facial features are destroyed), and the method of time domain noise suppression may improve the stability of recognition but requires an additional large amount of memory.

In some embodiments, the method of signal enhancement includes retaining the contrast of the image while enhancing the brightness of the image. Specifically, the purpose of brightness enhancement is to reduce the amount of light emitting elements (not shown), the volume of current of light emitting elements (not shown), and the power consumption of light emitting elements (not shown) in the light emitting unit 112, in order to reduce the cost and obtain an image with high quality. In some embodiments, the level of brightness enhancement is negatively correlated with the amount of the light emitting unit 112 (not shown), in other words, the level of brightness adjustment is negatively correlated with the intensity of the infrared light generated by the light emitting unit 112. For example, the smaller the intensity of the infrared light generated by the light emitting unit 112 is, the greater the brightness enhancement is. The larger the intensity of the infrared light generated by the light emitting unit 112 is, the smaller the brightness enhancement is.

In some embodiments, the processing unit 116 may be realized by a server, a circuit, a central processor unit (CPU), a microprocessor (MCU) or another equivalent device having functions of computing, data accessing, receiving signals or messages, transmitting signals or messages, and the like.

In some embodiments, when the image recognition process begins, the light emitting unit 112 selectively irradiates an infrared light, and the image capturing unit 114 captures an image of the target when the light emitting unit 112 irradiates the infrared light, and captures an image of the target when the light emitting unit 112 does not irradiates the infrared light, and then the image capturing unit 114 transmits the two captured images to the processing unit 116. The processing unit 116 performs noise suppression and signal enhancement on the two captured images, and then transmits processed images to the recognition device 120 for recognizing the target.

Figure 2:
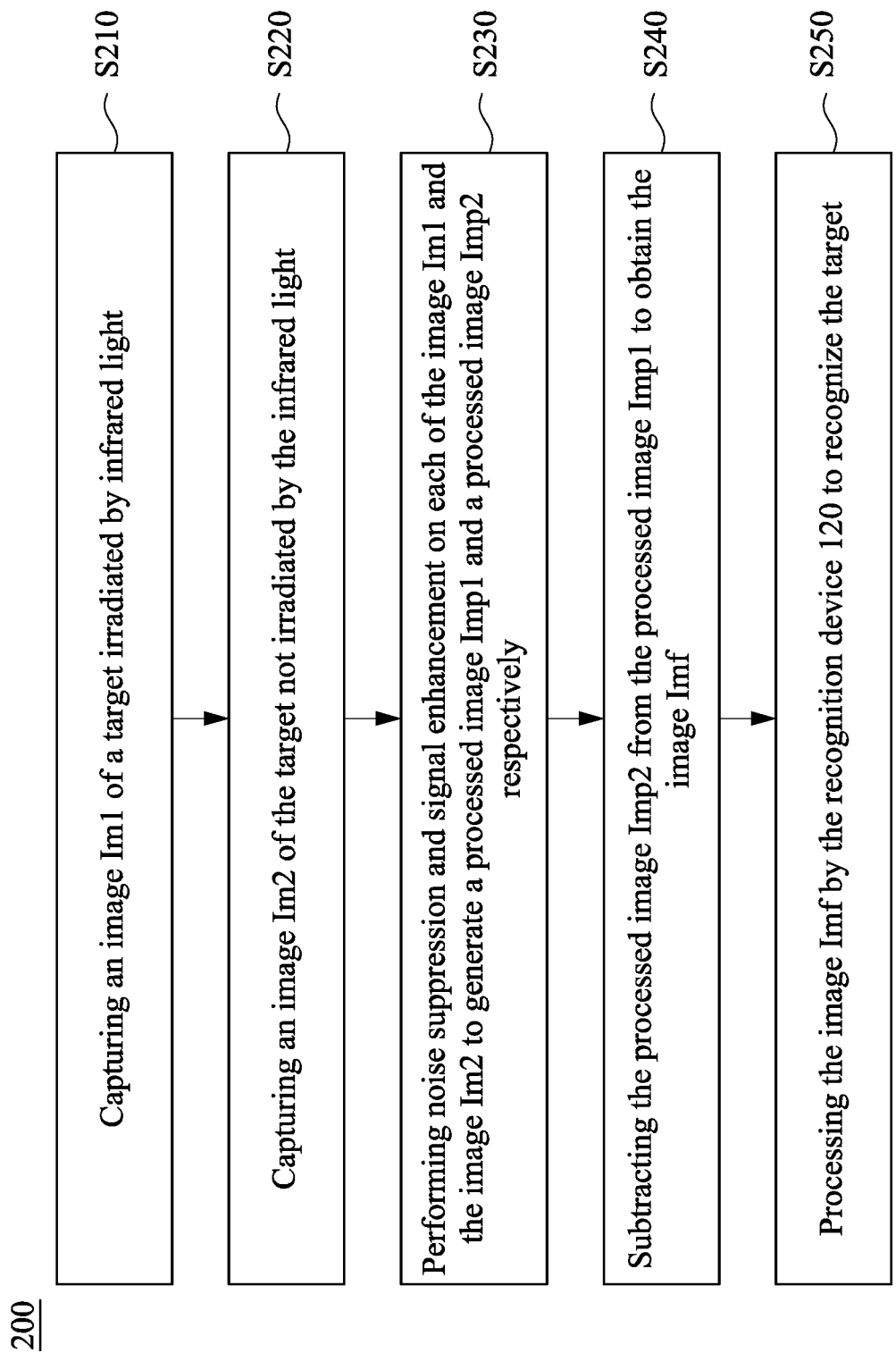
FIG. 2 is a flowchart of an image processing method of the image processing device in FIG. 1, in accordance with one embodiment of the present disclosure.
Figure 3:
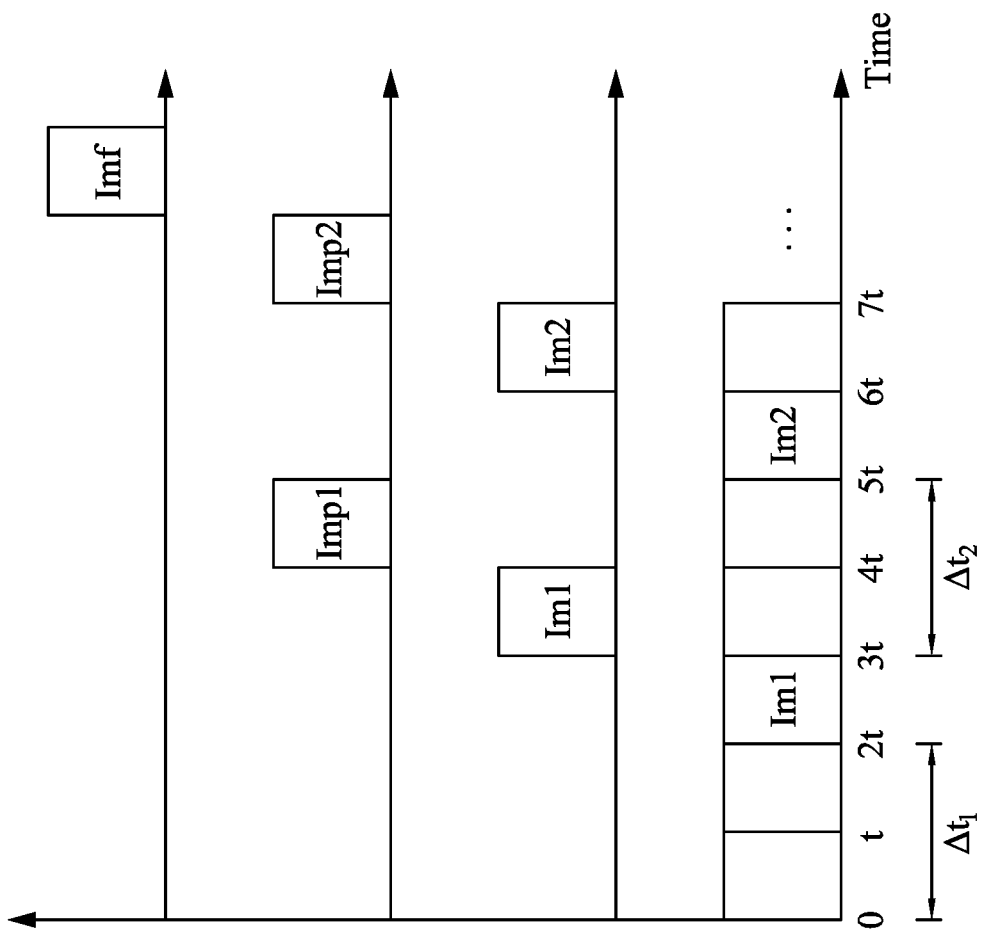
FIG. 3 is a procedure diagram of the image processing method in FIG. 2, in accordance with one embodiment of the present disclosure.

Reference is made to FIG. 1, FIG. 2 and FIG. 3. FIG. 2 is a flowchart of an image processing method 200 of the image processing device 110 in FIG. 1, in accordance with one embodiment of the present disclosure. FIG. 3 is a procedure diagram of the image processing method 200 in FIG. 2, in accordance with one embodiment of the present disclosure.

First, operation S210 is performed to capture an image Im1 of a target that is irradiated by infrared light. In this operation, reference is made to FIG. 3, the light emitting unit 112 starts to irradiate the infrared light on the target at a time point 0. When the infrared light irradiated by the light emitting unit 112 enters a stable state (i.e., at a time point 2t in this embodiment), the image capturing unit 114 captures the image Im1 of the target. In the embodiment of FIG. 3, the infrared light irradiated by the light emitting unit 112 takes, but not limited to, Δt1 to enter the stable state. The period of time from the beginning of irradiating the infrared light to the stable state of the infrared light may be adjusted according to different light emitting elements (not shown) used in the light emitting unit 112.

Then, operation S220 is performed to capture an image Im2 of the target that is not irradiated by the infrared light. In this operation, reference is made to FIG. 3, the light emitting unit 112 stops irradiating the infrared light on the target at a time point 3t. When the light emitting unit 112 is completely turned off (i.e., at a time point 5t in this embodiment), the image capturing unit 114 captures the image Im2. In the embodiment of FIG. 3, the light emitting unit 112 takes, but not limited to, Δt2 to be turned off completely, and then the image capturing unit 114 may capture the image Im2 that is not irradiated by the infrared light. In this embodiment, the values of both Δt1 and Δt2 are equal to, but not limited to, 2t. The values of Δt1 and Δt2 may be the same or different in accordance with the amount of light emitting diodes used in the light emitting unit 112. For example, t may be 1/15 seconds, and both Δt1 and Δt2 may be 2/15 seconds.

In some embodiments, there is no particular order between operation S210 and operation S220, specifically, when capturing images, the operation S210 may be performed before the operation S220, or the operation S220 may be performed before the operation S210.

Then, operation S230 is performed for performing noise suppression and signal enhancement on each of the image Im1 and the image Im2, so as to generate a processed image Imp1 and a processed image Imp2 respectively. In this operation, the processing unit 116 performs spatial domain or time domain noise suppression and signal enhancement on each of the image Im1 and the image Im2, so as to generate the processed image Imp1 and the processed image Imp2 respectively. In some embodiments, the algorithm of signal enhancement may be, but not limited to, a Gamma correction, or multiplying the infrared light component of each pixel in the image Im1/Im2 by a gain. Various algorithms that can be used to retain the contrast of the image while enhancing the brightness of the image are within the contemplated scope of the present disclosure.

In some embodiments, the processing unit 116 adjusts the level of brightness of the image Im1 and that of the image Im2 with the same ratio according to an intensity of the infrared light irradiated by the light emitting unit 112, in which the intensity of the infrared light irradiated by the light emitting unit 112 is negatively correlated with the level of brightness adjustment in the image Im1 and the image Im2. Specifically, the reason that the processing unit 116 adjusts the image Im1 and the image Im2 with the same ratio is to completely offset the pixel values contributed by the ambient light.

In other embodiments, the processing unit 116 adjusts the image Im1 and the image Im2 with different ratios according to intensity of the infrared light irradiated by the light emitting unit 112, in which the intensity of the infrared light irradiated by the light emitting unit 112 is negatively correlated with the level of brightness adjustment in the image Im1 and the image Im2. For example, if the light emitting unit 112 includes only one light emitting element (not shown) for cost saving, the image Im1 captured by the image capturing unit 114 when the target is irradiated by the infrared light from the light emitting unit 112 is relatively dark. Therefore, the processing unit 116 needs to brighten the image Im1 with a larger ratio and brighten the image Im2 with a smaller ratio, so as to obtain images similar to the images of the target that is irradiated by the light emitting unit 112 having multiple light emitting elements (not shown).

Then, operation S240 is performed to subtract the processed image Imp2 from the processed image Imp1, so as to obtain an image Imf. In this operation, the processing unit 116 subtracts the infrared light component of each pixel in the processed image Imp2 from the infrared light component of corresponding pixel in the processed image Imp1, so as to obtain the image Imf. The detailed implementation is shown as the following equation (1):

$$P_{imf}(i,j)=0, \text{ if } P_{imp1}(i,j)-P_{imp2}(i,j)<0$$

$$P_{imf}(i,j)=P_{imp1}(i,j)-P_{imp2}(i,j), \text{ if } P_{imp1}(i,j)-P_{imp2}(i,j)\geq 0 \quad (1)$$

As shown in the above equation (1), if the infrared light component $P_{imp1}(i,j)$ of the pixel (i,j) in the processed image Imp1 is smaller than the infrared light component $P_{imp2}(i,j)$ of the pixel (i,j) in the processed image Imp2, the pixel (i,j) in the processed image Imp1 is regarded as a noise, and thus the infrared light component of the pixel (i,j) needs to be reduced to 0. If the infrared light component $P_{imp1}(i,j)$ of the pixel (i,j) in the processed image Imp1 is equal to the infrared light component $P_{imp2}(i,j)$ of the pixel (i,j) in the processed image Imp2, the pixel (i,j) is regarded as being affected by the ambient light, and thus the infrared light component of the pixel (i,j) needs to be reduced to 0. If the infrared light component $P_{imp1}(i,j)$ of the pixel (i,j) in the processed image Imp1 is larger than the infrared light component $P_{imp2}(i,j)$ of the pixel (i,j) in the processed image Imp2, the pixel (i,j) is regarded as a part of the image of the target, and thus the infrared light component $P_{imf}(i,j)$ of the pixel (i,j) is equal to the infrared light component $P_{imp1}$ (i4) minus the infrared light component $P_{imp2}(i,j)$.

Then, operation S250 is performed to process the image Imf by using the recognition device 120, so as to recognize the target. In this operation, the processing unit 116 outputs the image Imf to the recognition device 120, and the recognition device 120 recognizes the target by using the image Imf according to a corresponding algorithm. For example, the recognition device 120 may recognize face features in the image Imf according to a face recognition algorithm, and performs an authentication process accordingly.

In other embodiments, the operations S240 and S250 may be replaced by operation S260 (not shown) to process the processed image Imp1 and the processed image Imp2 by using the recognition device 120, so as to recognize the target. The difference between the operation S260 and the combination of operation S240 and operation S250 is explained hereinafter. When the recognition device 120 needs two input images (i.e., one image of the target that is irradiated by the infrared light, and the other image of the target that is not irradiated by the infrared light) to recognize the target, the operation S260 is performed. When the recognition device 120 needs one input image to recognize the target, the operations S240 and S250 are performed.

Figure 4:
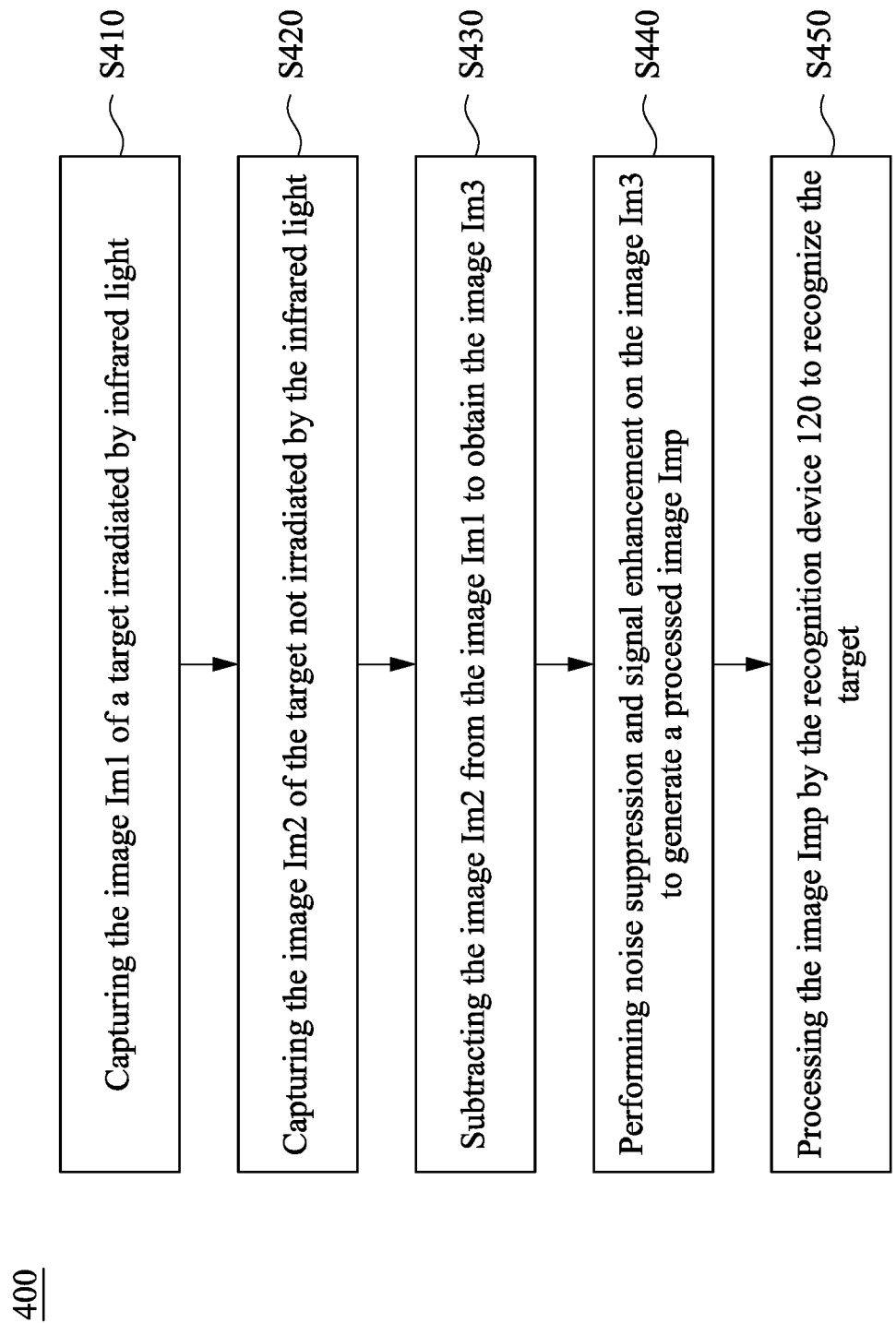
FIG. 4 is a flowchart of an image processing method of the image processing device in FIG. 1, in accordance with one embodiment of the present disclosure.
Figure 5:
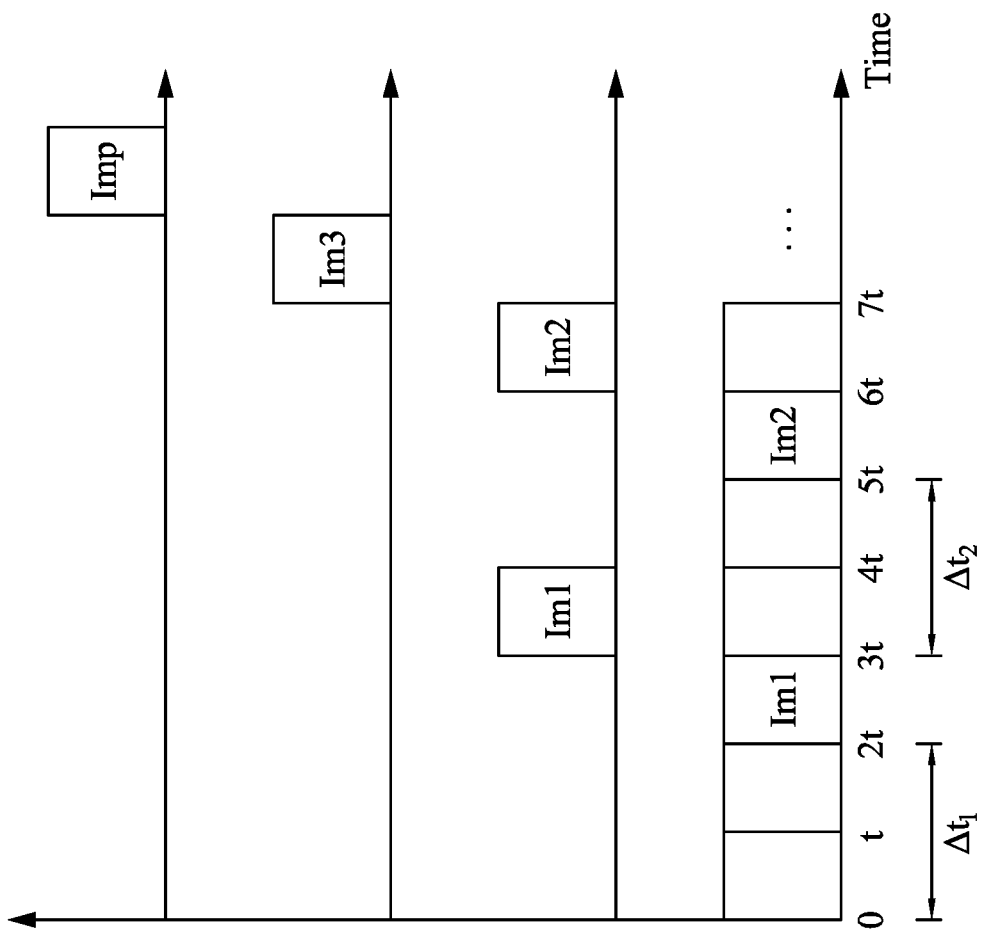
FIG. 5 is a procedure diagram of the image processing method in FIG. 4, in accordance with one embodiment of the present disclosure.

Reference is made to FIG. 1, FIG. 4 and FIG. 5. FIG. 4 is a flowchart of an image processing method 400 of the image processing device 110 in FIG. 1, in accordance with one embodiment of the present disclosure. FIG. 5 is a procedure diagram of the image processing method 400 in FIG. 4, in accordance with one embodiment of the present disclosure.

First, operation S410 is performed to capture an image Im1 of a target that is irradiated by infrared light. In some embodiments, the details of the operation S410 are the same as those of the operation S210, and thus are not described again herein.

Then, the operation S420 is performed to capture the image Im2 of the target that is not irradiated by the infrared light. In some embodiments, the details of the operation S420 are the same as those of operation S220, and thus are not described again herein.

Then, the operation S430 is performed to subtract the image Im2 from the image Im1, so as to obtain an image Im3. In this operation, the processing unit 116 subtracts the infrared light component of each pixel in the image Im2 from the infrared light component of corresponding pixel in the image Im1, so as to obtain the image Im3, as shown in FIG. 4.

Then, operation S440 is performed to perform noise suppression and signal enhancement on the image Im3, so as to generate an processed image Imp. In this operation, the processing unit 116 performs spatial domain or time domain noise suppression and signal enhancement on the image Im3, so as to generate the processed image Imp, as shown in FIG. 4. In some embodiments, the processing unit 116 adjusts the level of brightness of the image Im3 according to the infrared light irradiated by the light emitting unit 112, in which the intensity of the infrared light irradiated by the light emitting unit 112 is negatively correlated with the level of brightness adjustment in the image Im3.

Then, operation S450 is to process the processed image Imp by using the recognition device 120, so as to recognize the target. In this operation, the processing unit 116 outputs the processed image Imp to the recognition device 120, and the recognition device 120 recognizes the target by using the processed image Imp according to a corresponding algorithm.

In summary, the present disclosure captures images corresponding a target respectively by turning on and off the light emitting unit 112, and performs corresponding noise suppression and signal enhancement on the images, thereby obtaining the images with avoiding ambient light effects, thus further improving recognition accuracy of the recognition device 120.

Although the present invention has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image processing method, comprising:
capturing a first image of a target irradiated by infrared light;
capturing a second image of the target not irradiated by the infrared light;
performing noise suppression and signal enhancement on each of the first image and the second image to generate a first processed image and a second processed image respectively; and
processing the first processed image and the second processed image by a recognition device to recognize the target;
wherein the step of performing signal enhancement on each of the first image and the second image comprises:
adjusting brightness of the first image and the second image with a same ratio or different ratios according to an intensity of the infrared light.

2. The image processing method as claimed in claim 1, further comprising:
subtracting the second processed image from the first processed image to obtain an output image; and
processing the output image by the recognition device to recognize the target.

3. The image processing method as claimed in claim 1, wherein the step of processing the first processed image and the second processed image by the recognition device comprises:
processing the first processed image and the second processed image by a face recognition device to recognize a human face in the target.

4. The image processing method as claimed in claim 1, further comprising:
turning on an infrared light source to generate the infrared light; and
irradiating the target by the infrared light from the infrared light source when the infrared light is in a stable state.

5. The image processing method as claimed in claim 1, wherein the intensity of the infrared light is negatively correlated with a level of brightness adjustment of the first image and the second image.

6. The image processing method as claimed in claim 2, wherein the step of subtracting the second processed image from the first processed image comprises:
subtracting an infrared light component of each pixel in the second processed image from an infrared light component of a corresponding pixel in the first processed image.

7. An image processing method, comprising:
capturing a first image of a target irradiated by infrared light;
capturing a second image of the target not irradiated by the infrared light;
subtracting the second image from the first image to obtain a third image;
performing noise suppression and signal enhancement on the third image to generate a processed image; and
processing the processed image by a recognition device to recognize the target.

8. The image processing method as claimed in claim 7, wherein the step of processing the processed image by the recognition device comprises:
processing the processed image by a face recognition device to recognize a human face in the target.

9. The image processing method as claimed in claim 7, further comprising:
turning on an infrared light source to generate the infrared light; and irradiating the target by the infrared light from the infrared light source when the infrared light is in a stable state.

10. The image processing method as claimed in claim 7, wherein the step of subtracting the second image from the first image comprises:
    subtracting an infrared light component of each pixel in the second image from an infrared light component of a corresponding pixel in the first image.

11. The image processing method as claimed in claim 7, wherein the step of performing signal enhancement on the third image comprises:
    adjusting brightness of the third image according to an intensity of the infrared light.

12. The image processing method as claimed in claim 11, wherein the intensity of the infrared light is negatively correlated with a level of brightness adjustment in the third image.

13. An image processing device, comprising:
    a light emitting unit configured to selectively irradiate infrared light;
    an image capturing unit configured to capture a first image of a target irradiated by the infrared light when the light emitting unit irradiates the infrared light, and configured to capture a second image of the target not irradiated by the infrared light when the light emitting unit stops to irradiate the infrared light; and
    a processor coupled to the image capturing unit, configured to subtract the second image from the first image to obtain a third image, configured to perform noise suppression and signal enhancement on the third image to generate an output image, and configured to output the output image to a recognition device.

14. The image processing device as claimed in claim 13, wherein the processor is further configured to output the output image to a face recognition device for recognize a human face in the target.

15. The image processing device as claimed in claim 13, wherein the image capturing unit is configured to capture the first image of the target irradiated by the infrared light when the infrared light is in a stable state.

16. The image processing device as claimed in claim 13, wherein the processor is further configured to subtract an infrared light component of each pixel in the second image from an infrared light component of a corresponding pixel in the first image.

17. The image processing device as claimed in claim 13, wherein the processor is further configured to adjust brightness of the third image according to an intensity of the infrared light.

18. The image processing device as claimed in claim 17, wherein the intensity of the infrared light is negatively correlated with a level of brightness adjustment in the third image.

* * * * *